US005374458A

United States Patent [19]

Burgio

[11] Patent Number: 5,374,458

[45] Date of Patent: Dec. 20, 1994

[54] MOLDED, MULTIPLE-LAYER FACE MASK

[75] Inventor: Paul A. Burgio, Shoreview, Minn.

[73] Assignee: Minnesota Mining and Manufacturing Company, St. Paul, Minn.

[21] Appl. No.: 121,948

[22] Filed: Sep. 15, 1993

Related U.S. Application Data

[63] Continuation of Ser. No. 850,871, Mar. 13, 1992, abandoned.

[51] Int. Cl.[5] .......... A62B 7/10; B32B 5/06

[52] U.S. Cl. .......... 428/36.1; 428/36.2; 428/193; 428/284; 428/287; 428/296; 428/298; 428/299; 428/360; 428/373; 128/206.16; 128/206.17; 128/206.19

[58] Field of Search .......... 128/206.16, 206.17, 128/206.19; 428/284, 287, 296, 298, 299, 360, 373, 903, 36.1, 36.2, 193, 198

[56] References Cited

U.S. PATENT DOCUMENTS

| | | | |
|---|---|---|---|
| Re. 31,285 | 6/1983 | van Turnhout et al. | 55/155 |
| 1,292,095 | 1/1919 | Schwartz | 128/206.13 |
| 2,458,580 | 1/1949 | Fisketti et al. | 128/146 |
| 3,333,585 | 8/1967 | Barghini et al. | 128/212 |
| 3,603,315 | 9/1971 | Becker, III | 128/146.2 |
| 3,613,678 | 10/1971 | Mayhew | 128/146.2 |
| 3,620,214 | 11/1971 | Thackston | 128/146.2 |
| 3,664,335 | 5/1972 | Boucher et al. | 128/146.6 |
| 3,688,768 | 9/1972 | Reimschussel et al. | 128/146.2 |
| 3,971,373 | 7/1976 | Braun | 128/146.2 |
| 4,195,629 | 4/1980 | Halford | 128/206.13 |
| 4,215,682 | 8/1980 | Kubik et al. | 128/205.29 |
| 4,319,567 | 3/1982 | Magidson | 128/206.19 |
| 4,384,577 | 5/1983 | Huber et al. | 128/206.19 |
| 4,454,881 | 6/1984 | Huber et al. | 128/206.15 |
| 4,536,440 | 8/1985 | Berg | 428/284 |
| 4,579,113 | 4/1986 | McCreadie et al. | 128/202.13 |
| 4,600,002 | 7/1986 | Maryyanek et al. | 128/206.19 |
| 4,616,647 | 10/1986 | McCreadie | 128/206.19 |
| 4,641,645 | 2/1987 | Tayebi | 128/206.19 |
| 4,643,182 | 2/1987 | Klein | 128/201.25 |
| 4,729,371 | 3/1988 | Krueger et al. | 128/206.19 |
| 4,795,668 | 1/1989 | Krueger et al. | 428/174 |
| 4,802,473 | 2/1989 | Hubbard et al. | 128/206.19 |
| 4,807,619 | 2/1989 | Dyrud et al. | 128/206.16 |
| 4,850,347 | 7/1989 | Skov | 128/206.16 |
| 4,856,509 | 8/1989 | Lemelson | 128/206.19 |
| 4,941,470 | 7/1990 | Hubbard et al. | 128/206.13 |
| 5,012,805 | 5/1991 | Muckerheide | 128/205.28 |

FOREIGN PATENT DOCUMENTS

| | | |
|---|---|---|
| 0121299 | 10/1984 | European Pat. Off. . |
| 1589181 | 5/1981 | United Kingdom . |
| PCT/FR79/-00118 | 4/1981 | WIPO . |

*Primary Examiner*—Ellis P. Robinson
*Assistant Examiner*—Rena L. Dye
*Attorney, Agent, or Firm*—Gary L. Griswold; Walter N. Kirn; James D. Christoff

[57] ABSTRACT

A molded, cup-shaped face mask especially useful for medical and dental personnel has a first, second and third layer. Edge portions of the layers are substantially free of adhesion to one another, and outer edges of the mask are free of any peripheral seal or the like, so that the edge portions of all three layers are movable relative to each other and present a soft, comfortable feel to the wearer. Exhalation of air through the mask is facilitated by the flexible nature of the edge portions, and during inhalation the flexible edge portions are drawn toward a position of conformed contact with the wearer's face.

11 Claims, 1 Drawing Sheet

MOLDED, MULTIPLE-LAYER FACE MASK

This is a continuation of application Ser. No. 07/850,871 filed Mar. 13, 1992 which is now abandoned.

BACKGROUND OF THE INVENTION

1. Field of the Invention

This invention relates to a molded face mask made of multiple layers in a manner that enhances comfort for the user.

2. Description of the Related Art

Disposable face masks are widely used in hospitals and medical and dental offices to reduce exposure to potentially hazardous bodily fluids or other contaminants that may become airborne. One type of such masks is the non-molded mask termed "flat mask" such as shown in U.S. Pat. Nos. 4,941,470, 4,802,473, 4,195,629, 2,458,580 and 1,292,095. Flat masks are relatively comfortable but may collapse during inhalation and enable a portion of the mask to contact the wearer's mouth and nasal openings. Consequently, there is a risk that fluid absorbed on a central portion of a flat mask may come into contact with the wearer's mouth and nasal openings.

Disposable masks made of fibrous webs molded into a cup-shaped configuration are also well known. Examples are described, for example, in U.S. Pat. Nos. 5,012,805, 4,807,619, 4,856,509, 4,850,347, 4,600,002, 4,536,440 and 3,333,585. Molded masks generally retain their cup-shaped configuration and in normal use the central portion of the mask does not collapse and come in contact with the wearer's mouth during inhalation.

The term "respirator" is often applied to a closely-fitting disposable face mask that has a relatively high filtration efficiency and that is used in areas such as construction or industrial settings where protection is desired from inhalation of sub-micron particulates that tend to remain suspended in the atmosphere for relatively long periods. Over the years, considerable effort has been expended to improve the filtering efficiency of respirators in order to reduce the amount of inhaled airborne contaminants. In this regard, effort has been directed toward improving the seal between the edge of the respirator and the wearer's face so that the substantial majority of the inhaled air does not bypass the filter media. Generally, cup-shaped molded respirators are preferred in instances where relatively high concentration levels of contaminants are present because the edge of the respirator can be brought into line contact with the user's face to establish a better seal than generally exists during use of flat masks.

Molded disposable masks and respirators are sometimes made of one or more fibrous layers that have been coated with a resin to enhance stiffness and help retain the molded, cup-shaped configuration. The resin-coated layers often adhere to each other after the molding process. Masks and respirators having one or more relatively stiff layers can be provided with one or two strong head straps that pull the mask or respirator tightly against the face to establish a good seal.

Disposable face masks and respirators are sometimes provided with a peripheral rib, seam or other structure in an attempt to achieve continuous contact of the edge of the respirator with the wearer's face. For example, U.S. Pat. No. 3,333,585 describes a fibrous mask with an edge covered by a bias fabric edging tape to make a softer fit. U.S. Pat. No. 4,600,002 describes a multiple-layer respirator stitched together with a binder strip folded over its edges. Edge structure that is relatively stiff may assist in maintaining the mask or respirator in a cup-shaped configuration.

One commercially available respirator (no. 8710, 3M) has an inner and an outer shaping layer with a filtration layer sandwiched between the shaping layers. The three layers are not adhered to each other by a resin coating; instead, a peripheral edge portion of the respirator is subjected to heat and pressure to establish a fused-together, bonded contact line closely adjacent the peripheral edge of the respirator.

Respirators with edge seals or bonded edge regions, like respirators with multiple layers bonded together, are often preferred for use in atmospheres with hazardous concentrations of suspended particulate matter. However, in medical and dental fields, the atmosphere is often relatively free of suspended particulates and personnel are instead concerned with droplets of bodily fluids such as saliva or blood, or small particulates that may be temporarily projected through the air. Dental personnel, for example, often work in close proximity to the patient and may wish to protect themselves from the patient's saliva that may be splashed or splattered about. Additionally, dental drilling procedures may cause pieces of the patient's tooth or old restorations to be propelled in the direction of the dentist or dental assistant.

Medical and dental personnel who wear face masks on a regular basis tend to wear such masks for extended periods of time, often over substantially the entire working day. Consequently, such individuals prefer a mask that is very comfortable and does not irritate the skin. Further, the availability of comfortable face masks may provide an inducement for some individuals to wear such masks more frequently and continuously than might otherwise be realized.

SUMMARY OF THE INVENTION

The present invention is directed toward a face mask that has a first layer made of a fibrous web and a second layer in face-to-face contact with the first layer and made of a fibrous web. At least one of the first layer and the second layer is molded to a generally cup-shaped configuration. The mask also includes a head strap and means for connecting the head strap to at least one of the first layer and the second layer. The first layer and the second layer have complemental, interengaged edge portions terminating in generally coextensive, side-by-side outer edges. The edge portions extend substantially around the entire periphery of the generally cup-shaped configuration, and the edge portion of the first layer is substantially free of adherence to the edge portion of the second layer. Additionally, the outer edges are substantially disconnected from one another.

The multiple-layer mask of the invention provides substantial comfort to users in comparison to conventional face masks and respirators, even when worn over extended periods of time. The edge portions provide comfort because of the lack of any resin adhesive or the like. In some instances, the loose edge portions may provide comfort by slightly shifting relative to each other when conforming to the contour of the wearer's face. Also, the non-adhering edge portions and disconnected outer edges enable an easier escape of exhaled air in pathways next to the edge of the mask than is often observed in connection with tightly-fitting masks having adhering layers or bound edges. The mask is particularly satisfactory for use in environments such as medical or dental offices where protection from fluids or solid particles directed through the atmosphere is more important than protection from suspended particulates or droplets.

DETAILED DESCRIPTION OF THE PREFERRED EMBODIMENT

Figure 1:
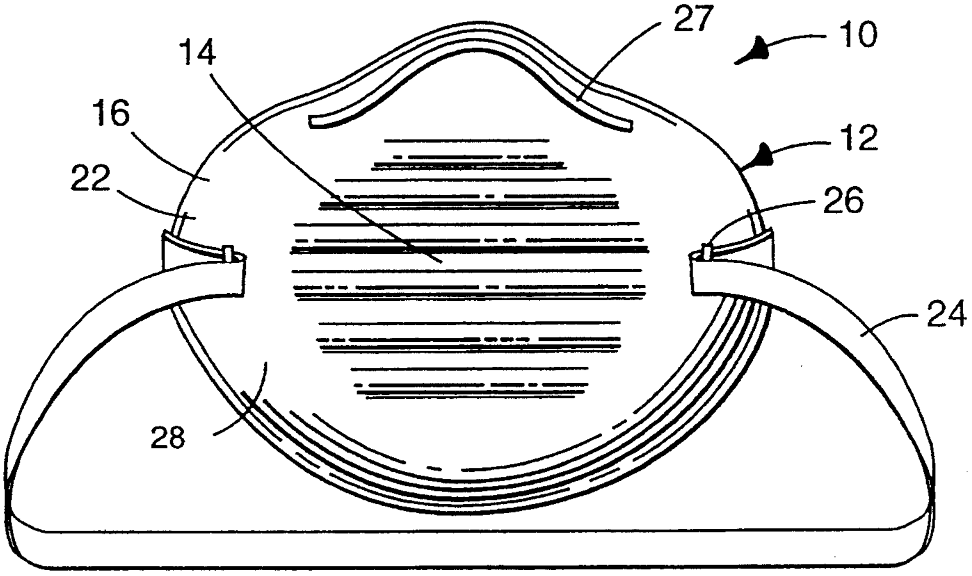
FIG. 1 is a front elevational view of a face mask constructed in accordance with a preferred embodiment of the invention.
Figure 2:
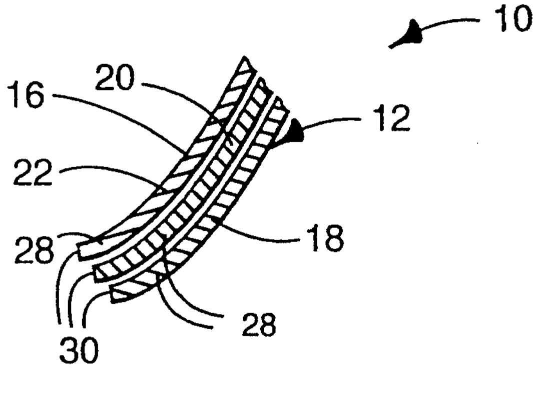
FIG. 2 is an enlarged cross-sectional view through a portion of the periphery of the face mask shown in FIG. 1.

A disposable face mask 10 is illustrated in FIGS. 1 and 2 and includes a mask body 12 molded to a generally cup-shaped configuration. The body 12 includes a horizontally corrugated central region 14 adapted to extend across the nose and mouth of the wearer at a distance slightly spaced therefrom. The body 12 is circumscribed by a peripheral region 16 that surrounds the central region 14. The peripheral region 16 is adapted to complementally fit against the wearer's face along the side of the cheeks, beneath the chin and over and around the bridge of the nose.

As shown in FIG. 2, the mask body 12 comprises three layers: a first or inner layer 18 termed a shaping layer, a second or intermediate layer 20 termed a filtration layer, and a third or outer layer 22 termed a shaping layer. Although the term "shaping layer" is used in this description, the shaping layer may also have other functions such as protection of the filtration layer, prefiltration of incoming air or providing a soft, comfortable inner layer intended for extended contact with the face.

Preferably, the first and third layers 18, 22 are comprised of a fibrous web with some of the fibers carrying a binder material by which the fibers can be bonded to one another at points of fiber intersection. One useful fiber of this type is a bicomponent fiber that comprises a core of crystalline polyethylene terephthalate (PET) surrounded by a sheath of a polymer formed from isophthalate and terephthalate ester monomers. Bicomponent fibers are described in U.S. Pat. Nos. 4,536,440, 4,729,371 and 4,795,668, the disclosures of which are expressly incorporated into the present disclosure. A preferred bicomponent fiber is "MELTY" brand Type 4080 fiber, 4 denier, average length 5.1 cm, from Unitika Limited.

A presently preferred web for the first layer 18 is made of 70% by weight of the MELTY bicomponent fiber mentioned above and 30% by weight of single component PET fiber. A presently preferred web for the third layer is made of 50% by weight of the MELTY fiber and 50% by weight of the single component PET fiber. A preferred single component PET fiber is No. 444 fiber, 3.5 denier, average length 2.5 cm, from Eastman; an alternative is "TREVIRA" brand fiber Type 121 from Hoechst Celanese.

The middle or second layer 20 is also a fibrous web, and preferably comprises an electrically charged melt-blown polypropylene microfiber web. Webs of other melt-blown fibers are also useful, such as taught in Wente, Van A., "Superfine Thermoplastic Fibers" in *Industrial Engineering Chemistry*, Vol. 48, pp. 1342 et seq. (1956), especially when in a persistent electrically charged form such as described in U.S. Pat. No. 4,215,682. Preferably the fibers of the second layer 20 have an average diameter of less than about 10 micrometers. Alternative fibrous webs may also be made of rosin-wool, glass fiber or electrically charged fibrillated-films such as taught in U.S. Pat. Re. No. 31,285.

The shaping layers 18, 22 are preferably dry fluffy webs, such as prepared on air-laying equipment, and have a loft of at least 5 mm. The third layer 22 is typically not a primary filtering layer, though it may serve some prefiltering or coarse filtering action. It should be sufficiently porous so as to contribute only a minor portion of the pressure drop through the mask 10 and preferably no more than 20 percent of the pressure drop through the mask 10. The first and third layers 18, 22 have a relatively low weight, preferably a basis weight of 150 lbs. per ream or less, and more preferably 100 lbs. per ream or less.

The mask 10 includes a single head strap 24, about 32.5 to 37.5 cm in length, made from an elastic material such as extruded latex rubber (Globe Manufacturing Company, Fall River, Mass.). The head strap 24 has sufficient length and elasticity to urge the peripheral region 16 of the mask 10 toward the face when the head strap 24 is placed behind the head. The head strap 24 is fixed to the peripheral region 16 of the mask 10 by two couplers or staples 26 that extend through all of the three layers, 18, 20 and 22.

As illustrated in FIG. 1, a pliable dead-soft band 27 made of aluminum is adhesively connected to the third layer 22 and extends along the peripheral region 16 in an area adjacent the user's nose. Once the mask 10 is placed on the face with the head strap 24 extending behind the head, the band 27 is elastically deformed to complementally conform to the shape of the wearer's nose.

Each of the layers 18, 20, 22 has an edge portion 28 that terminates in an outer edge 30. As illustrated in FIG. 2, the overlapping edge portions 28 of the layers 18, 20, 22 are complemental in shape and engage edge portions 28 of the adjacent layers 18, 20, 22. Additionally, the outer edges 30 of the layers 18, 20, 22 are coextensive and extend in side-by-side relationship to one another.

The layers 18, 20, 22 including respective edge portions 28 are free of adherence or secure interconnection to each other as might otherwise occur through chemical reaction or heat bonding to one another, although the layers 18, 20, 22 to a slight degree may become somewhat fiber entangled. Moreover, the outer edges of the layers 18, 20, 22 are disconnected from one another and not fixed together such as might otherwise occur by the use of a stitched seam, seal or other type of bonding structure.

Advantageously, the unbonded layers 18, 20, 22 provide more comfort than a similar mask having multiple layers bonded together by resin, since the uncoated edge portions 28 of the present invention are softer and more resilient than similar structure that is coated or impregnated with resin. The edge portions 28 easily deflect and conform to the contours of the user's face. During exhalation, the edge portions 28 of one or more layers 18, 20, 22 may readily shift away from the wearer's face to permit the exhaled air to escape to the atmosphere. During inhalation, the relatively flexible edge portions 28 are urged toward a position of conforming, complemental contact with the face, causing a majority of the inspired air to be filtered through the mask body 12 rather than bypass the same along paths between the outer edges 30 and the wearer's face. In some instances, the inner, first layer 18 during exhalation may remain in contact with the face, while the second and third layers 20, 22 shift slightly to enable the escape of the exhaled air along a path between the first layer 18 and the second layer 20 in directions parallel to the plane of the peripheral region 16.

The invention will be further illustrated by the following example:

EXAMPLE

Face mask bodies were prepared from three-layer sheets according to Example 1 of U.S. Pat. No. 4,536,440. The resulting mask bodies were then cut from the sheets by stacking 12 to 15 sheets atop each other, and putting the stacked sheets in a press having 15 dies in the shape of the intended mask bodies. The dies were then closed to cut the mask bodies from the sheets.

Next, a nose band was bonded to the outer layer of each mask body using a 0.14 mm thick layer of an ethylene vinyl acetate thermal adhesive (3M, No. 41-9100-3935-7). In addition, opposite ends of an elastic head strap were fixed to the layers using metal staples that extended through all three layers.

The layers of the resultant mask, including peripheral edge portions, were substantially free of adherence to one another and were comfortable in use over extended periods of time. In addition, exhalation of air was relatively easy.

Filtration efficiency of 10 masks was evaluated by testing for penetration of dioctyl phthalate (DOP) aerosol through the mask. DOP penetration data was obtained using an Air Techniques, Inc., Model Q127 DOP Penetrometer set at a flow rate of 85 liters per minute and generating an aerosol of 0.3 micron DOP particles at a mass concentration of 100 mg/m$^3$. The DOP penetration was measured by comparison of upstream (i.e., before the mask) and downstream (i.e., after passing through the mask) aerosol concentrations using light scattering photometry. The percent filtration efficiency was calculated using the following formula:

$$\%\ \text{Filtration Efficiency} = \left(1 - \frac{\text{Downstream aerosol concentration}}{\text{Upstream aerosol concentration}}\right) \times 100$$

The masks had an average filtration efficiency of 95%, which is very satisfactory for masks worn in medical and dental offices.

Bacterial filtration efficiency ("BFE") of the masks was tested by Nelson Laboratories, Inc. of Salt Lake City, Utah according to their protocol No. ARO/007 and Military Specification 36954C 4.4.1.1.1. A 24 hour culture of *Staphylococcus aureus* was diluted to a certain, control concentration. The culture suspension was pumped through a 'Chicago' nebulizer (Dependable Scientific Glass, Salt Lake City) at a certain controlled flow rate and with sufficient air pressure to provide a particle size range of 2.8 to 3.6 microns. The particles were collected in a glass aerosol chamber and drawn through an Andersen 6-stage viable microbial particle sizing sampler (Andersen 2000 Inc., Atlanta, Ga.) at a flow rate of 28.3 liters per minute.

Control values were obtained using the Andersen sampler to impinge the aerosol particles onto one of six agar plates according to the size of the particles. The media used was a 1.5 weight % soybean casein digest agar. The agar plates were incubated at 37° C. for 48 hours and the colonies were counted using an Artec Counter (Model 880, Artec, Dynatech). Colony counts were converted to probable hit values ("HITS") using the chart supplied with the Andersen sampler.

Test values for the masks were obtained by placing the central portion of each of 10 masks between the aerosol chamber and the 7.6 cm diameter sample port of the Andersen sampler. Each mask sample was clamped into place and challenged with an average challenge amount of 2022 colonies. The agar plates were incubated and the colonies were counted and converted to hit values using the procedure for obtaining the control values. The bacterial filtration efficiency was calculated by the following formula:

$$\%\ BFE = \left(1 - \frac{\text{HITS (Control)} - \text{HITS (Mask Sample)}}{\text{HITS (Control)}}\right) \times 100$$

The mask samples had an average bacteria filtration efficiency of 99% which is very satisfactory for masks used in medical and dental offices.

I claim:

1. A face mask comprising:

at least a first and second layer formed of a fibrous web in face-to-face contact each with respect to the other, at least one of said layers being molded to a generally cup-shaped configuration;

a head strap; and means for connecting said head strap to said first and second layers defining a connection area, said means providing the only substantial means for connecting said first layer to second layer;

said first layer and said second layer having complemental edge portions in direct contact with each other and terminating in side-by-side outer edges that extend in generally coextensive relationship to one another, said edge portions extending substantially around the entire periphery of said generally cup-shaped configuration, said edge portion of said first layer being substantially unbonded to said edge portion of said second layer, said outer edges being not substantially fixed to one another, said edge portion of said second layer being displaceable relative to said edge portion of said first layer for providing an air passage therebetween for egress of air passing therethrough.

2. The face mask of claim 1, wherein said first layer is free of adherence to said second layer.

3. The face mask of claim 1, wherein said means comprises at least one staple.

4. The face mask of claim 1, wherein said second layer comprises bicomponent fibers.

5. The face mask of claim 4, wherein one component of said bicomponent fibers is a binder material.

6. The face mask of claim 1, wherein said first layer comprises a shaping layer.

7. The face mask of claim 1, wherein said second layer comprises bicomponent fibers and single component fibers.

8. The face mask of claim 1, including a third layer having an edge portion next to said edge portions of said first layer and said second layer and substantially free of adherence to said edge portions of said first layer and said second layer.

9. A face mask comprising:

at least a first and second layer formed of a fibrous web in face-to-face contact each with respect to the other, said first layer and said second layer being molded to a generally cup-shaped configuration;

a head strap; and means for connecting said head to said first and second layers defining a connection area, said means providing the only substantial means for connecting said first layer to said second layer, said first and second layer having edge portions external said connection area in direct contact with each other, said first and second layer being substantially unsecured each to the other external said connection area for providing an air passage at a peripheral edge portion of said first and second layers when said edge portions are flexibly deformed.

10. The face mask of claim 9, wherein said means comprises a staple.

11. The face mask of claim 9, and including a third layer complemental in shape to said first layer and said second layer, wherein said means provides the only substantial means for connecting said third layer to said second layer and said first layer.

* * * * *